Oct. 6, 1959 W. RIEDEL 2,907,210
THERMOSTATS
Filed June 18, 1956 6 Sheets-Sheet 1
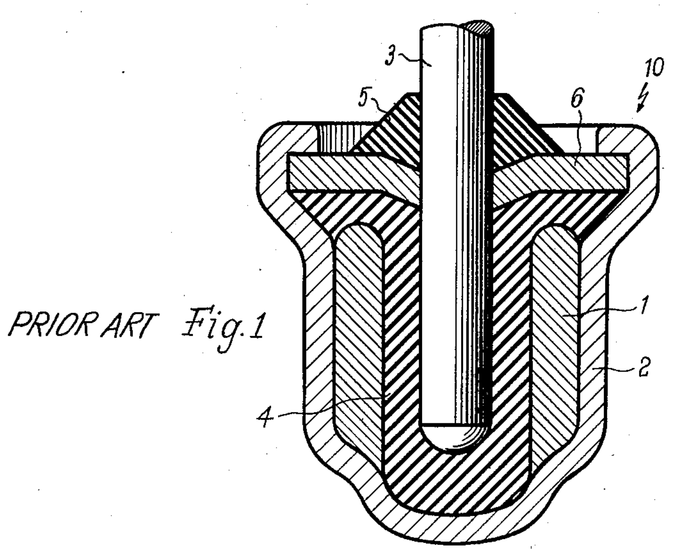
PRIOR ART Fig. 1
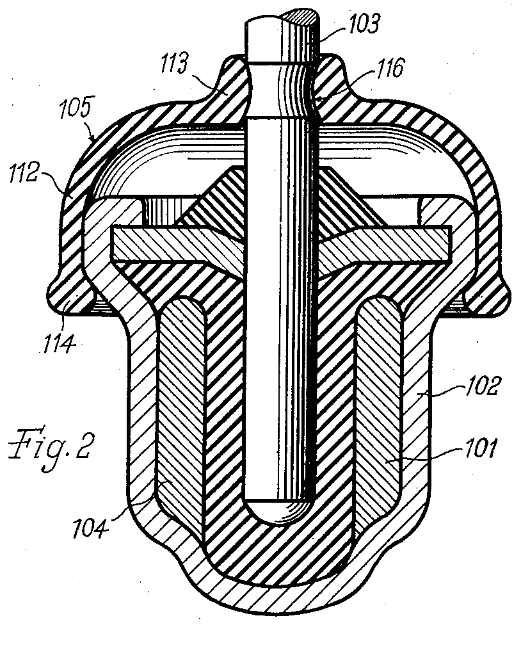
Fig. 2

Oct. 6, 1959 W. RIEDEL 2,907,210

THERMOSTATS

Filed June 18, 1956 6 Sheets-Sheet 2

Oct. 6, 1959

W. RIEDEL 2,907,210

THERMOSTATS

Filed June 18, 1956

6 Sheets-Sheet 3

Oct. 6, 1959 W. RIEDEL 2,907,210

THERMOSTATS

Filed June 18, 1956 6 Sheets-Sheet 4

Oct. 6, 1959 W. RIEDEL 2,907,210

THERMOSTATS

Filed June 18, 1956 6 Sheets-Sheet 5

Oct. 6, 1959

W. RIEDEL

THERMOSTATS 2,907,210

Filed June 18, 1956

6 Sheets-Sheet 6

United States Patent Office 2,907,210

Patented Oct. 6, 1959

2,907,210

THERMOSTATS

Walther Riedel, Stuttgart, Germany

Application June 18, 1956, Serial No. 591,861

Claims priority, application Germany June 20, 1955

19 Claims. (Cl. 73—368.3)

Figure 3:
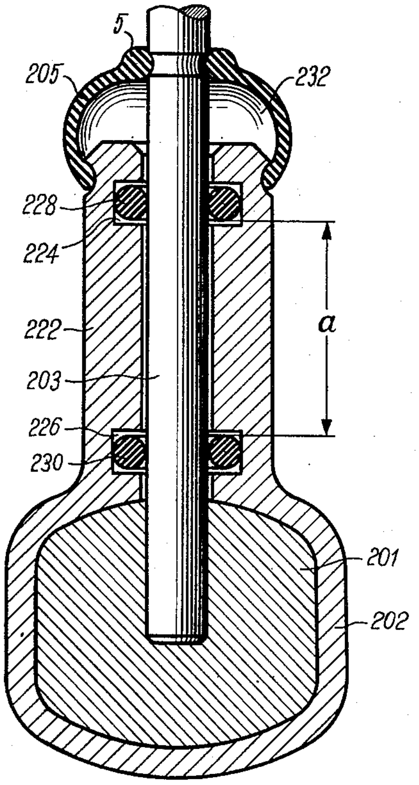

This invention relates to thermostats and more particularly to thermostats of the kind, wherein an actuating plunger is movable relative to a housing which latter is adapted to be arranged in the medium or bath to be measured and the movements of said plunger are effected in response to a temperature-sensitive expansible material which latter is accommodated within said housing.

Thermostats of this kind are known, wherein an exact amount of expansible material is accommodated within the housing—which latter is indifferent to temperature changes—in such a manner that between the expansible material and the movable plunger arranged in the housing a hat-shaped rubber membrane is provided which jointly with the wall of the housing defines a closed chamber for the expansible material. The provision of the closed chamber is important, because the specific quantity of expansible material housed therein has to be maintained constant for a prolonged period of time so as not to alter the characteristics of the thermostat. In constructing a thermostat in this manner, considerable demands have of course to be made on the consistency of volume of the rubber membrane, which latter for a long period of time is subjected both to the constant strain of repeated changes of temperature and to the constant strain of repeated changes in pressure up to 250 kilograms per cubic centimeter. Very few kinds of rubber stand up to these requirements.

A further difficulty in the construction of these known thermostats resides in the fact, that the rubber membrane has to be sealed against the liquid or the like surrounding the thermostat in such a manner that this liquid does not cause the swelling or shrinking of the membrane. However, difficulties have been encountered in successfully effecting such sealing since due to the reciprocating movements of the plunger, small amounts of liquid easily are conveyed from the surrounding medium into contact with the membrane. If it is attempted to avoid this phenomenon by providing a further lip sealing or the like, then the further drawback arises that the working characteristic of the thermostat is negatively affected. This is due to the fact that the forces required for overcoming the friction forces between the moving plunger and this additional sealing means can not be quantitatively determined and moreover are subject to change after some time since wear on the sealing surfaces of the sealing means can of course not be avoided.

The life and characteristic of these known thermostats is further negatively affected by the fact that the membrane bearing on the plunger is subjected to a fulling or felting stress and the sliding movement of the plunger in the hat-shaped membrane is opposed and hindered by increased friction caused by increased pressure resulting from the expansion of the expansible material.

It is an object of this invention to provide a thermostat of the kind referred to which overcomes the mentioned drawbacks.

Moreover, it is an object of this invention generally to improve on thermostats of the kind referred to as now customarily built.

Figure 4:
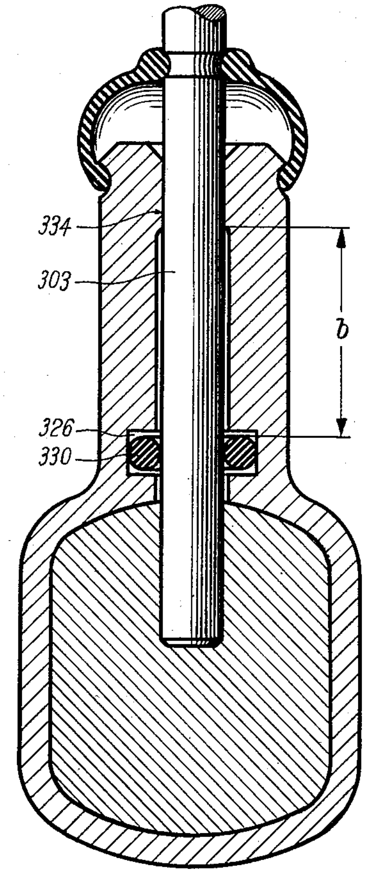
Figure 5:
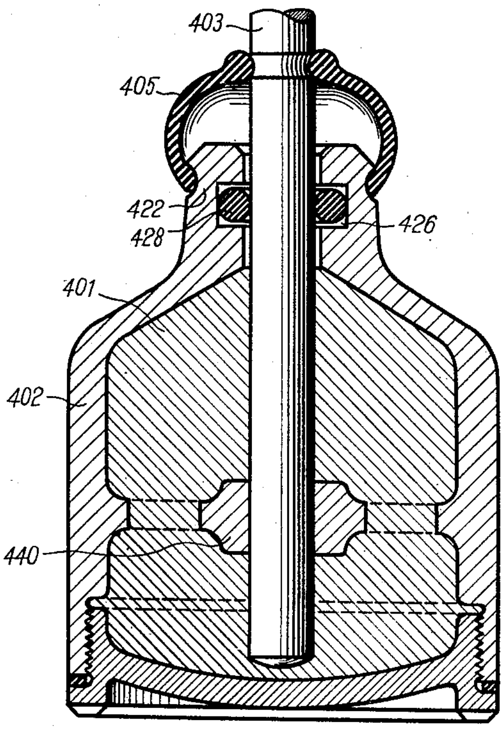
Figure 6:
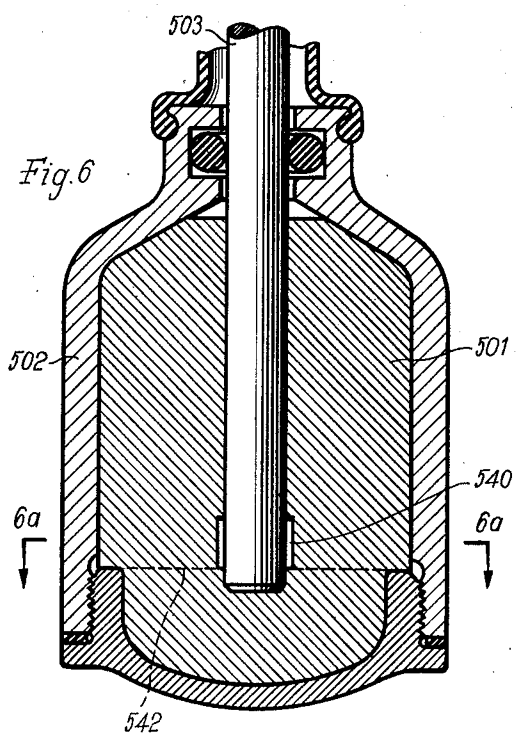
Figure 6A:
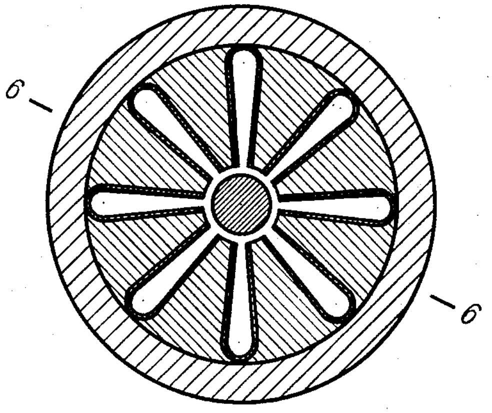
Figure 7:
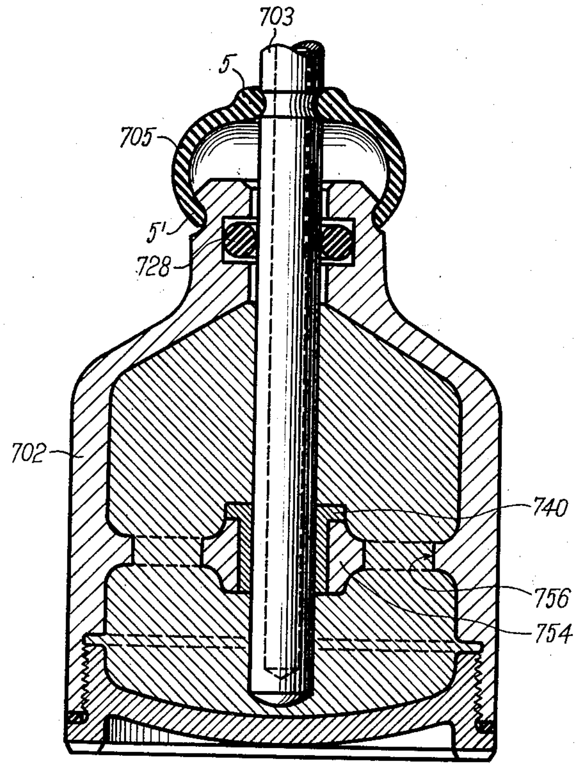

Other objects and advantages of the present invention will be apparent from the following detailed description thereof, when read in conjunction with the accompanying drawings forming part of this specification, wherein:

Fig. 1 shows a known thermostat in vertical section,

Fig. 2 shows in vertical section a first embodiment of a thermostat in accordance with the invention, Fig. 3 shows in vertical section a second embodiment of an inventive thermostat, Fig. 4 shows in vertical section a third embodiment of an inventive thermostat, Fig. 5 shows in vertical section a fourth embodiment of an inventive thermostat, Fig. 6 shows in vertical section a fifth embodiment of an inventive thermostat, Figs. *6a–d* show in horizontal section through the housing of a thermostat four different embodiments of heat conducting inserts, Fig. *6e* is a sectional view of a detail of the embodiment shown in Fig. 6, Fig. 7 shows in vertical section a further embodiment of an inventive thermostat.

Referring now to the drawings and in particular to Fig. 1, reference numeral 10 generally indicates a portion of a known thermostat. The thermostat 10 comprises a housing generally indicated by 2 which housing is made from material indifferent to temperature changes. This housing is adapted to be immersed into a bath or the like to the temperature of which the thermostat is to respond. Expansible material 1 is accommodated within the housing 2 as is a hat-shaped rubber membrane 4. The membrane 4 and the wall of the housing 2 define a chamber corresponding to the size of the material 1. A plunger 3 is movably arranged within the housing, the upper end of the plunger 3 projecting from the housing and being capable of operative engagement with the adjusting and remaining operative parts of the thermostat (not shown). Sealing means 5 and 6 bear on the membrane 4 and the plunger 3, respectively. When the expansible material 1 expands due to a temperature change in the bath, the plunger 3 is moved upwardly through the medium of the membrane 4, whereby the thermostat is actuated. It will be realized that this construction has all the disadvantages referred to in the introduction of the specification.

As can be seen in Fig. 2 these disadvantages are overcome in accordance with this invention by providing a particular sealing membrane 105 between the pressure housing 102 and the projecting end of the plunger 103. The sealing membrane 105 comprises a pre-tensioned body portion 112 having bead-shaped end portions 113 and 114, respectively. The bead-shaped end portion 113 engages in a recess or groove 116 of the plunger while the bead-shaped end portion 114 is clamped between an abutment member (not shown) and the wall of the housing 102. It will be realized that the plunger 103 during its movement does not perform a sliding movement relative to the pre-tensioned sealing membrane 105 but that the latter will follow the movements of the plunger so that only an elastic change of form of the sealing membrane 105 will take place. This arrangement prevents the leakage or penetration of liquid, for example water or oil, between the plunger 103 and the membrane 104. In choosing a suitable material for the membrane 104, thus only the action of the expansible material 101 on the membrane and the changes in pressure and temperature have to be considered, but no consideration with regard to shrinkage or swelling has to be taken. In contrast thereto, in known constructions as for example embodied in Fig. 1, the membrane had to be made from a material which at its two opposite surfaces was capable of withstanding chemical and physical attacks of completely different nature.

With a view to overcoming the difficulties and disadvantages in the construction of known thermostats, the invention also provides for another measure, viz a thermostat is provided, wherein the movable plunger directly dips into the expansible material without providing an intermediate membrane. In this manner all the disadvantages connected with and resulting from the employment of a hat-shaped rubber membrane are eliminated. If such a construction of a thermostat is chosen, particular care has to be taken that the initial quantity of the employed expansible material remains constant during the entire life of the thermostat. This is accomplished to a large extent by the provision of a sealing membrane such as disclosed in Fig. 2, i.e. a sealing membrane arranged between the plunger and the housing, which sealing membrane is only subjected to elastic deformation. In any other construction in which portions of the moving plunger slide relative to a stationary sealing and are alternately surrounded by the expansible material and the bath fluid, it is unavoidable that expansible material is conveyed through the pores of the plunger to the outside. This amount of expansible material would thus be lost and washed away by the bath fluid. It will be realized that the reliability and characteristics in general of the thermostat could thus be greatly impaired and the life of the thermostat would be unduly shortened.

However, if in accordance with a feature of this invention, that portion of the plunger which slides past a guiding means—which guiding means preferably is fitted with a sealing body—is protected against contact with the bath fluid, then this results in a considerable increase of the life of the thermostat. This is due to the fact that roughening or the like due to corrosion and/or deposition and sedimentation of boiler scale or the like on the plunger is avoided. Further, a disturbing stress or load on the surface of the sealing body is thus prevented.

Two embodiments of the construction referred to are illustrated in Figs. 3 and 4. The housing 202 comprises an integral sleeve portion 222 in which the plunger 203 is reciprocably movable with little play. The sealing membrane 205 arranged between the projecting end of the plunger 203 and the sleeve portion 222 is of similar construction as that illustrated in Fig. 2. In the embodiment shown in Fig. 3 two spaced apart grooves 224 and 226, respectively are provided in the sleeve portion 222 into which annular resilient sealing and guiding members 228 and 230 are respectively inserted. The members 228, 230 have circular cross-sections. The space defined by the housing 202 proper below the sleeve portion 222 is fitted with expansible material 201; the distance *a* between the annular members 228 and 230 is greater than the maximum stroke length *h* of the plunger. The space 232 formed between the sealing membrane 205 and the sleeve portion 222 with its plunger 203 may be wholly or partly filled with a suitable lubricant which lubricant then effects a continuous lubrication of the portion of the plunger moving through the space.

In the embodiment shown in Fig. 4 only one lower annular groove 326 is provided in the sleeve portion into which an annular resilient member 330 is inserted. The upper guiding zone is constituted by a metallic guiding surface 334. The distance *b* between the lower end of the surface 334 and the groove 326 is again greater than the maximum stroke length *h* of the plunger.

From the embodiments illustrated in Figs. 3 and 4 it is apparent that the shaft of the plunger is sealed and/or guided by means of guiding means at two-spaced apart zones in a sleeve portion of the housing. These zones may thus serve the twofold purpose of guiding and sealing. As is seen, it is particularly advantageous to employ for the purpose referred to resilient annular members having substantially circular cross-section which members are inserted into grooves of the sleeve portion. These annular members then bear under pretension on the plunger and since they are elastically deformed during the movements of the plunger, they assure a particularly effective sealing. As has been described, the guiding zone which is situated towards the projecting end of the plunger may advantageously be formed by a metallic bushing forming a guiding surface along which the plunger slides or by a similar bushing of synthetic material. The distance between the two guiding and/or sealing zones is preferably greater than the maximum stroke of the plunger. This results in the fact that the sealing constituted by the lower annular members 230 or 330, respectively is not affected by wear, roughening or the like of the plunger in the region of the upper sealing or guiding. It will be realized that the rubber membrane previously described has become redundant and the plunger is in direct contact with the expansible material. Moreover, as pointed out, the initial quantity of expansible material is fully preserved and no contact of the portion of the plunger sliding past the guiding means with bath solution does occur.

A further embodiment in which one of the guiding zones is arranged within the space or chamber proper of the housing 402 is shown in Fig. 5. Again a sealing membrane 405 is arranged between a sleeve portion 422 and the projecting end of the plunger 403 while expansible material 401 is inserted into the chamber of the housing 402. The housing comprises two parts screwed into each other. The upper guiding zone is formed by an annular member 428 inserted into an annular groove 426 of the sleeve portion 422. The lower guiding zone is formed by an inwardly projecting member 440 secured to the wall of the housing 402 and situated within the housing proper. The distance *a* is again greater than the maximum stroke length *h*. The projecting member 440 not only serves as guiding means but has a further purpose as well. Since all the expansible materials commonly used in thermostats exhibit poor heat conductivity, the response capacity of the thermostat is considerably enhanced by the provision of this projecting member which is embedded within the expansible material and is in direct heat-conducting connection with the wall of the housing 402. When the thermostat is immersed into a bath or the like, the surrounding heat is thus more readily conducted to the expansible material.

Fig. 6 shows a housing 502 comprising two parts screwed into each other. Again a stationary interior guiding member 540 is arranged within said housing 502. As may be readily gathered from Figs. 6*a*–6*d*, the chamber or interior of the housing is partially filled with a heat-conducting insert 542 which is destined to increase the heat transfer from the surrounding fluid to the expansible material 501, whereby the response time of the thermostat is shortened. The guiding member 540 forms part of the insert 542.

Figure 6E:
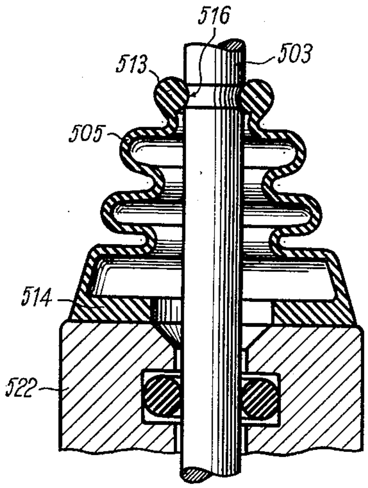
Figure 6B:
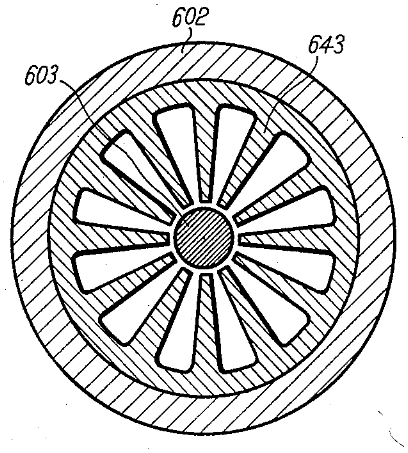
Figure 6C:
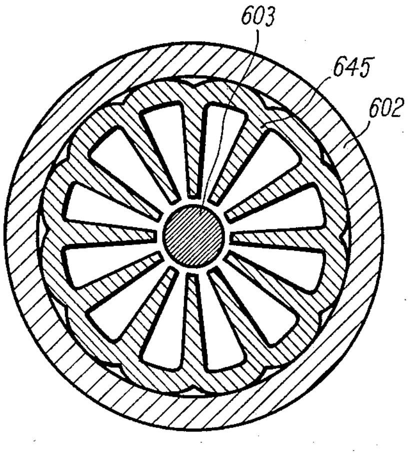
Figure 6D:
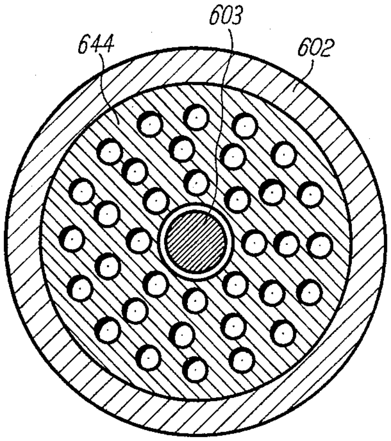

Fig. 6*e* shows the sealing membrane 505 of the embodiment of Fig. 6 in detail which sealing membrane is of different shape than that of the previous embodiments. As will be seen in Fig. 6*e* the sealing membrane 505 has an upper bead-shaped end portion 513 engaging in a recess 516 of the plunger 503 and a lower end portion 514 attached, for example cemented, to the top surface of the sleeve portion 522.

Figs. 6*a*–6*d* which are horizontal sections through a housing 602 with plunger 603 illustrate the cross-sections of four different suitable heat-conducting inserts 642, 643, 645, and 644, respectively. The insert 542 of Fig. 6 may thus have the shape of one of the inserts 642–645 shown in Figs. 6*a*–6*d*.

With a view to reducing the heat capacity of the plunger, the latter is preferably hollow, whereby the response time of the thermostat is increased and a faster adjustment of the thermostat is obtained. Fig. 7 illustrates an embodiment with hollow plunger. As in the other embodiments, a housing 702 is provided in which the hollow plunger 703 is guided. The sealing membrane is indicated at 705 while the upper guiding and sealing member is seen at 728. The lower guiding body is constituted by a bushing 740 of synthetic material which is pressed into a circular plate 754 secured to the housing 702. The plate 754 is provided with bores 756.

I have described preferred embodiments of my invention, but it is understood that this disclosure is for the purpose of illustration and that various omissions and changes in shape, proportion and arrangement of parts, as well as the substitution of equivalent elements for those herein shown and described may be made without departing from the spirit and scope of the invention as set forth in the appended claims.

What I claim is:

1. In a thermostat the combination of: a housing having at least one opening, expansible means arranged within said housing, an actuating plunger movably arranged within said housing for guided movement through said opening, one end portion of said plunger projecting from said housing, said plunger being movable in response to the expansion of said expansible means, and resilient sealing means extending between the projecting end portion of said plunger and said housing, said resilient sealing means having one central end portion fixed about said plunger for simultaneous and coextensive movement therewith, the other peripheral edge end portion of said sealing means being attached about said opening to said housing, whereby said sealing means is resiliently deformed upon movement of said plunger.

2. In a thermostat as claimed in claim 1, said sealing means being pretensioned.

3. In a thermostat as claimed in claim 1, said projecting end of said plunger having a groove, and said resilient sealing means having said central end portion engaging in said groove.

4. In a thermostat as claimed in claim 3, said central end portion being bead-shaped.

5. In a thermostat as claimed in claim 1, a resilient membrane arranged in said housing and interposed between said plunger and said expansible means.

6. In a thermostat as claimed in claim 1, said expansible means filling the entire space defined by the wall of said housing and said plunger.

7. In a thermostat as claimed in claim 1, guiding means arranged in said housing for guiding said plunger.

8. In a thermostat as claimed in claim 1, first guiding means arranged in said housing adjacent to said opening for guiding said plunger, and second guiding means arranged in said housing for guiding said plunger.

9. In a thermostat as claimed in claim 8, said first and second guiding means being spaced apart at a distance which is greater than the maximum stroke length of said plunger.

10. In a thermostat as claimed in claim 8, at least one of said first and second guiding means comprising a resilient sealing member arranged in said housing and bearing on said plunger.

11. In a thermostat as claimed in claim 8, at least one of said first and second guiding means comprising a smooth metallic surface bearing on said plunger.

12. In a thermostat as claimed in claim 8, at least one of said first and second guiding means comprising a guide bushing of synthetic material, said bushing surrounding said plunger.

13. In a thermostat as claimed in claim 8, said housing including a sleeve portion for receiving said plunger with play, said sleeve portion having at least one annular groove, and at least one of said first and second guiding means being inserted into said groove for guiding said plunger.

14. In a thermostat as claimed in claim 13, at least one of said guiding means comprising a resilient annular member bearing on said plunger.

15. In a thermostat as claimed in claim 8, said housing having a sleeve portion for receiving said plunger and a chamber portion holding said expansible material, one of said guiding means being arranged in said sleeve portion, and the other one of said guiding means being arranged in said chamber portion.

16. In a thermostat as claimed in claim 1, heat-conducting means arranged in said housing and being in heat-conducting engagement therewith for increasing the heat transfer to said expansible material.

17. In a thermostat as claimed in claim 1, said plunger being hollow.

18. In a thermostat the combination of: a housing, said housing comprising a sleeve portion and a wider chamber portion, an actuating plunger passing through said sleeve portion into said chamber portion, one end portion of said plunger projecting from said housing, expansible means accommodated within said chamber portion, said plunger being movable in response to expansion of said expansible means, resilient sealing means extending between the projecting end portion of said plunger and said sleeve portion, said sealing means having one central end portion fixed about said plunger for simultaneous and coextensive movement therewith, the other peripheral edge end portion of said sealing means being attached to said sleeve portion, whereby said sealing means is resiliently deformed upon movement of said plunger, first guiding means arranged within said sleeve portion for guiding said plunger, and second guiding means arranged within said housing for guiding said plunger at a point spaced from said first guiding means, said first guiding means sealing said plunger with respect to said housing.

19. In a thermostat as claimed in claim 18, said second guiding means being arranged within said chamber portion, the distance between said first and second guiding means being greater than the maximum stroke length of said plunger.

References Cited in the file of this patent

UNITED STATES PATENTS

| | | |
|---|---|---|
| 2,694,415 | Dillon | Nov. 16, 1954 |
| 2,797,873 | Woods | July 2, 1957 |